2 Sheets--Sheet 1.

N. F. MATHEWSON.

Improvement in Harvesters.

No. 5,093. Reissued Oct. 8, 1872.

Witnesses:
O. H. Whitlesey
P. Williams

Inventor:
N. F. Mathewson
by his Atty
W. D. Baldwin

THE NORRIS PETERS CO., PHOTO-LITHO., WASHINGTON, D. C.

2 Sheets--Sheet 2.

N. F. MATHEWSON.

Improvement in Harvesters.

No. 5,093. Reissued Oct. 8, 1872.

*Witnesses:*

R. F. Wheatley
J. Williams

*Inventor:*

N. F. Mathewson
by his Atty
Wm. Baldwin

THE NORRIS PETERS CO., PHOTO-LITHO., WASHINGTON, D. C.

UNITED STATES PATENT OFFICE.

NATHAN F. MATHEWSON, OF BLOOMINGTON, ILLINOIS, ASSIGNOR, BY MESNE ASSIGNMENTS, TO JOHN E. ATWOOD.

IMPROVEMENT IN HARVESTERS.

Specification forming part of Letters Patent No. 88,653, dated April 6, 1869; reissue No. 5,093, dated October 8, 1872.

DIVISION A.

*To all whom it may concern:*

Be it known that I, NATHAN F. MATHEWSON, formerly of Barrington, in the county of Bristol and State of Rhode Island, but now residing at Bloomington, in the county of McLean and State of Illinois, have invented a new and useful Improvement in Mowing-Machines, of which the following is a specification:

My invention relates to mowers of the class known as "two-wheeled, front-cut, hinged-bar" machines, having a cutting apparatus projecting laterally beyond the inner wheel. Its object is to enable the driver, while riding upon the machine, and by a single movement of a lever, to raise the coupling-frame and cutting apparatus, turn up the latter until it rests against the main frame, and lock it in said elevated and turned-up position. The subject-matter claimed is hereinafter particularly specified.

Figure 1:
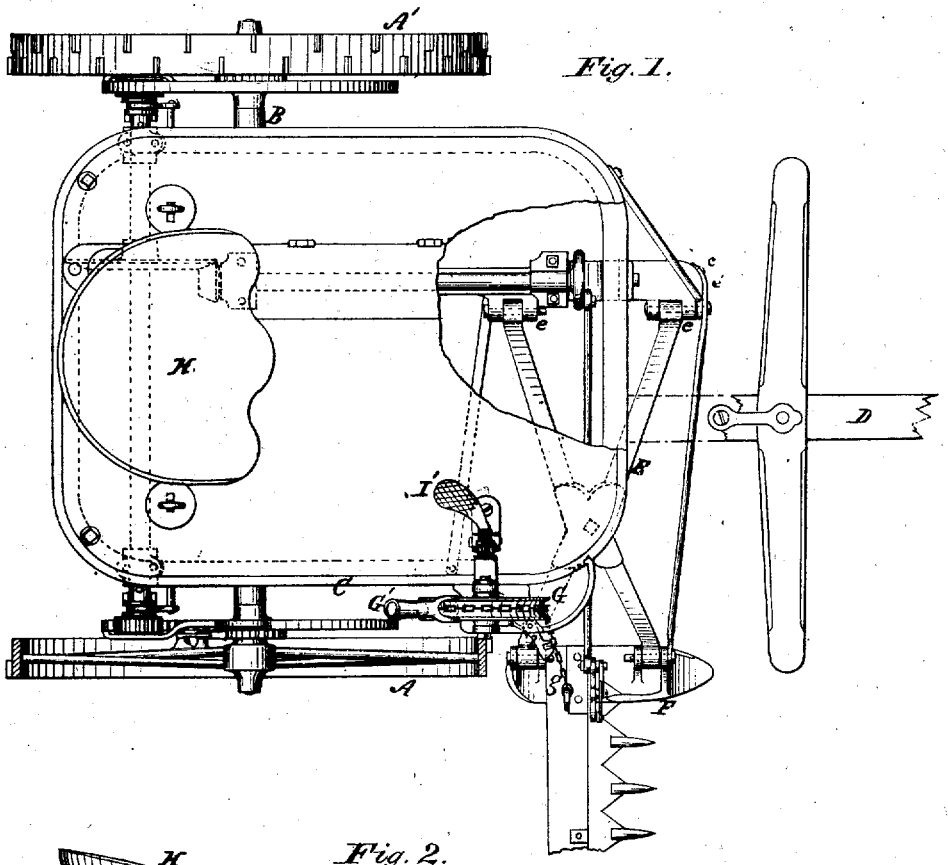
Figure 2:
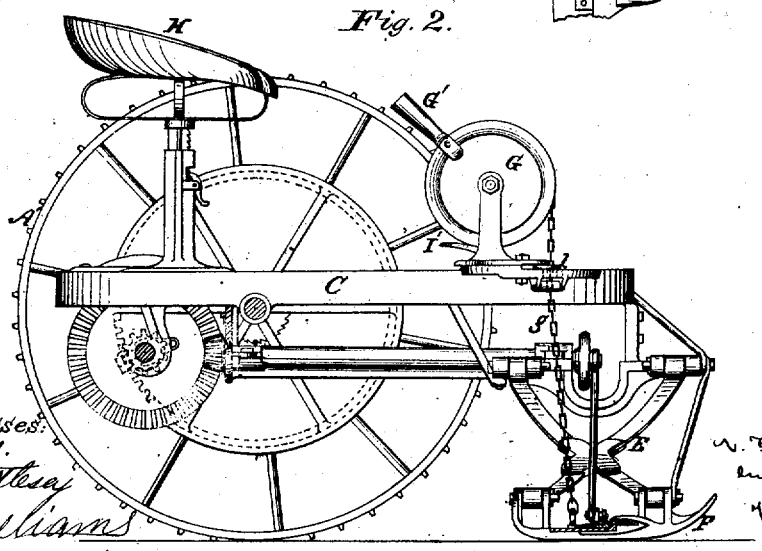
Figure 3:
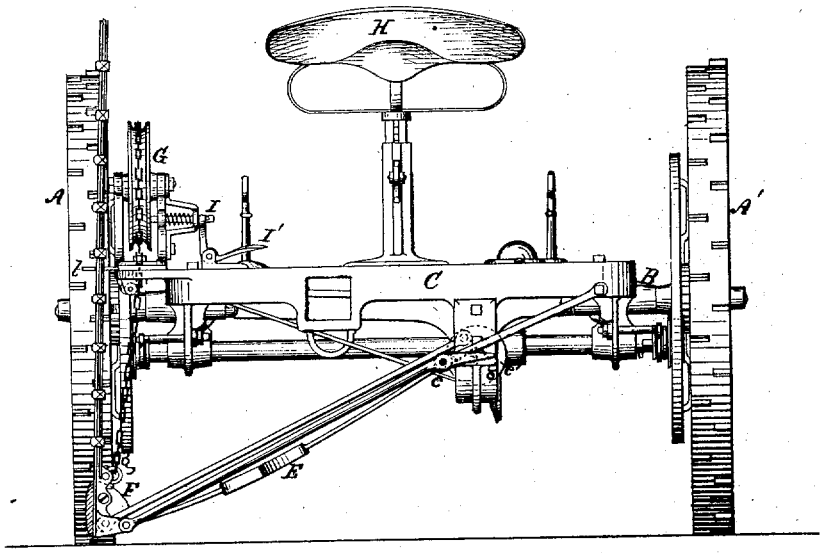
Figure 4:
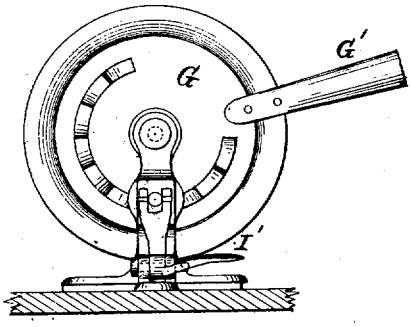
Figure 5:
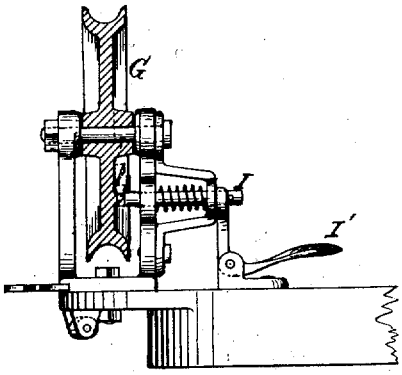

In the accompanying drawing, which represents a mowing-machine embodying my invention, Figure 1 is a plan with the inner driving-wheel in section; Fig. 2, a side elevation with the inner wheel removed; Fig. 3, a front elevation; Fig. 4 is a side view; and Fig. 5, a vertical transverse section through the lifting-pulley and its detent.

Those parts only of the machine necessary to illustrate the subject-matter claimed will be described, the construction of the other parts being well known.

Two main wheels, A A′, are mounted on axles B, supporting a main frame, C, from which a tongue, D, projects, as usual. A coupling-frame, E, is pin-jointed at *e* to the main frame. An arm, *e′*, connected with the coupling-frame, abuts against a stop, *c*, on the main frame, to limit the upward movement of the coupling-frame. In the drawing the arm *e′* is shown as forming an extension of a brace-rod, connecting the coupling-frame and main frame. A shoe, F, is pin-jointed to the coupling-frame, and carries the finger-beam, guards, and cutters, as usual. A lifting-chain, *g*, is attached to the finger-bar outside the plane of the joints of the shoe, and to a lifting-pulley, G, mounted on the main frame, and controlled by a hand-lever, G′, operated by the driver from his seat H. A spring-bolt, I, takes into notches on the lifting-pulley, being retracted, when desired, by a treadle, I′. A spring-hook, *l*, on the main frame holds up the finger-beam when turned up.

In operation, the driver lifts the finger-beam and coupling-frame by means of the lifting devices, above described, until the arm *e′* abuts against the stop *c*, when the ascent of the coupling-frame is arrested; the continued pull on the lifting-chain then turns the finger-beam up against the frame, as in Fig. 3, where it is caught and locked by the spring-hook, the lifting-pulley being locked by its spring at the same time. The cutting apparatus is thus readily raised, folded up, and held, by a single movement of the lifting-lever, a great desideratum in practice.

Lifting and locking devices have been used prior to my invention in combination with hinged finger-beams, but not in the manner claimed by me.

I claim as my invention—

The combination of the main frame and its stop, the double-hinged coupling-frame, the stop-arm connected with the coupling-frame, the hinged finger-beam, the lifting-chain attached outside of the joint of the shoe, the lifting-pulley and its detent, and the spring-hook, all these members being constructed and operating in combination, substantially as set forth, to lift, turn up, and lock the finger-beam by a single movement of the lifting-lever.

NATHAN F. MATHEWSON.

Witnesses:

WALTER B. VINCENT,
JAMES H. PARSONS.